United States Patent
Fritz et al.

(10) Patent No.: US 8,505,071 B2
(45) Date of Patent: Aug. 6, 2013

(54) PREVENTING AUTOMATED PROGRAMS AND UNAUTHORIZED USERS IN A NETWORK

(75) Inventors: Adam Fritz, Seattle, WA (US); Yiqing Wang, Bothell, WA (US)

(73) Assignee: Disney Enterprises, Inc., Burbank, CA (US)

( * ) Notice: Subject to any disclaimer, the term of this patent is extended or adjusted under 35 U.S.C. 154(b) by 1405 days.

(21) Appl. No.: 11/755,061

(22) Filed: May 30, 2007

(65) Prior Publication Data

US 2008/0301778 A1 Dec. 4, 2008

(51) Int. Cl.
*H04L 9/32* (2006.01)

(52) U.S. Cl.
USPC ..................... 726/3; 726/2; 726/28

(58) Field of Classification Search
USPC .................. 726/3, 2, 28
See application file for complete search history.

(56) References Cited

U.S. PATENT DOCUMENTS

| | | | | |
|---|---|---|---|---|
| 5,928,364 | A * | 7/1999 | Yamamoto | 726/18 |
| 6,141,751 | A * | 10/2000 | Ogawa | 713/170 |
| 6,161,185 | A * | 12/2000 | Guthrie et al. | 726/5 |
| 6,209,104 | B1 * | 3/2001 | Jalili | 726/18 |
| 6,980,081 | B2 * | 12/2005 | Anderson | 340/5.53 |
| 6,981,016 | B1 * | 12/2005 | Ryan | 709/203 |
| 7,114,077 | B2 * | 9/2006 | Miller et al. | 713/183 |
| 7,197,646 | B2 * | 3/2007 | Fritz et al. | 713/182 |
| 7,441,122 | B2 * | 10/2008 | Plagne | 713/182 |
| 7,577,987 | B2 * | 8/2009 | Mizrah | 726/5 |
| 7,596,701 | B2 * | 9/2009 | Varghese et al. | 713/182 |
| 7,616,764 | B2 * | 11/2009 | Varghese et al. | 380/255 |
| 7,644,433 | B2 * | 1/2010 | Mizrah | 726/2 |
| 7,747,868 | B2 * | 6/2010 | Park | 713/183 |
| 7,891,005 | B1 * | 2/2011 | Baluja et al. | 726/26 |
| 2004/0030934 | A1 * | 2/2004 | Mizoguchi et al. | 713/202 |
| 2004/0123151 | A1 * | 6/2004 | Mizrah | 713/201 |
| 2004/0123160 | A1 * | 6/2004 | Mizrah | 713/202 |
| 2005/0138376 | A1 * | 6/2005 | Fritz et al. | 713/168 |
| 2007/0234423 | A1 * | 10/2007 | Goodman et al. | 726/21 |

OTHER PUBLICATIONS

Charlie White. "Hotcaptcha: Hot Babes Eliminate Bots" Published Jul. 17, 2006 at Gizmodo.com (1 page) http://gizmodo.com/187781/hotcaptcha-hot-babes-eliminate-bots.*
Bin B. Zhu et al. "Attacks and Design of Image Recognition CAPTCHAs" © 2010 ACM (14 pages) http://homepages.cs.ncl.ac.uk/jeff.yan/ccs10.pdf.*
Ellen Beldner. "User-centered interaction design since 1995 (sort of)" Published Sep. 2006 (2 pages) http://ellenbeldner.info/2006/09.*
Monica Chew, J.D.Tygar. "Image Recognition CAPTCHAs" UC Berkeley Computer Science Division technical report UCB/CSD-04-1333, published Jun. 10, 2004 (19 pages).*

* cited by examiner

*Primary Examiner* — Beemnet Dada
*Assistant Examiner* — Thomas Gyorfi
(74) *Attorney, Agent, or Firm* — Patterson & Sheridan, LLP

(57) ABSTRACT

A system for preventing an unauthorized user in a networked computing environment includes a client computer provided with a visual test upon a request transmitted through a network by the client computer for a service, wherein the visual test is displayed on a video display, wherein the visual test requires the performance of a predetermined action on a group of images displayed on the video display in order to gain access to the service, wherein the group of images comprises at least two images that are associated with each other.

22 Claims, 4 Drawing Sheets

PREVENTING AUTOMATED PROGRAMS AND UNAUTHORIZED USERS IN A NETWORK

BACKGROUND

Many computer users currently use various types of networked computing services that require a form of registration or authentication. Typically, registration for the service dictates that the user provide information, such as name, a user name, an address, a password, etc. Authentication for the service may include requiring the user to provide a user name and password. For many networked computing services, authentication may also require the user to establish that the user is a human being and that the user is in fact the authorized user for the service.

E-mail is an example of a networked computing service that is available to many users connected on a network. The user connects his or her computer to the Internet through an Internet Service Provider ("ISP"). The user can then open an e-mail account through any number of e-mail services. Many of these e-mail services have a registration process in which the user must provide information such as a name, a user name, an address, etc. in order to open an e-mail account. Once an e-mail account is opened, the computer user can then send and receive messages from other computer users that use the Internet.

A continuing problem facing Internet users is receiving e-mail called SPAM. SPAM is essentially junk e-mail that has relatively little worth to most e-mail users. E-mail users must spend a great deal of time looking through and deleting these unwanted e-mails from their mailboxes in order to keep their mailboxes from exceeding size limits imposed by ISP's. Further, SPAM expends a great deal of bandwidth on the Internet. A large number of resources are needed for transmitting and receiving junk e-mail. As a result, Internet resources that are used for more useful data flow have slower response times and are less efficient.

SPAM can be propagated in many different ways. One of the main causes of SPAM is computers that use scripts to impersonate users. During the registration process for an e-mail address, a computer can use a script to generate multiple e-mail addresses that do not even have a corresponding human user. These multiple e-mail addresses can then be used by the computer to send unwanted e-mail messages to other Internet users.

Computers can also be used to run scripts that send out multiple e-mail messages from a user generated e-mail address or from a script generated e-mail address to the same set of recipients. A computer user would take a great deal of time to send out a large number of e-mail messages to a set of recipients. On the other hand, a computer running a script can transmit e-mail messages at the speed that it would take thousands of computer users to perform the same task in the same amount of time.

Another area of services in which scripts pose a large problem is internet voting services and Internet contests. The Internet has many web pages in which users can participate in a poll. For instance, users can vote for their favorite musician, artist, athlete, etc. The user can always return to the web page and vote another time, but the chances are small that most users will bother trying to vote again. However, a computer can use a script to vote a large number of times in a very small amount of time. The result is that the voting results are skewed a by a large amount. Further, a user that enters a contest will almost never win if a script places thousands of entries into the same contest.

While the above-mentioned examples of networked computing services are susceptible to automated programs, there are many other instances in which it is desirable to authenticate the user of the networked service and to establish that the user of the networked service is a human being.

A computer running a script is one class if invalid user. Another class of invalid user may be a human being that may have been hired to defeat the authentication process for a particular computer service. In such an instance, it is not only desirable that the authentication process be capable of defeating an automated script, but also that the authentication process be capable of discerning between the authorized human user and an unauthorized human being that is attempting to defeat the authentication process.

Some approaches to solving the problem of computers running scripts involve the use of authentication schemes. For instance, a randomly selected string can be modified so that only a human user will be able to guess the result. A string of text can be rearranged over a shaded background so that the user can pick out the text. The user is then required to type in the text that stands out from the background.

A number of problems exist with these types of authentication schemes. Computer users do not want to spend the time to perform tedious tasks such as typing in a string of text to authenticate themselves. Further, the static feature of this type of test allows more advanced image filtering programs to decipher the string. Finally, e-mail software that is dependent on a character set may make international deployment difficult. Further, while somewhat effective against an automated script, such an approach is ineffective against an unauthorized human being attempting to defeat the authentication process.

SUMMARY

Embodiments of the invention include a system for preventing an unauthorized user in a networked computing environment. The system includes a server that can provide access to a service, wherein the service is stored on a memory associated with server, a software module stored on the server, wherein the software module provides a visual test upon a request transmitted through a network for the service, wherein the visual test includes the performance of a predetermined action on a group of images in order to gain access to the service, a validation software module stored on the server, wherein the validation software module receives a request from the software module for the group of images, wherein the validation software module selects the group of images to be transmitted to the software module, wherein the validation software module provides the software module with the group of images, and an access software module, wherein the access software module receives an access instruction from the validation software module if the visual test is passed, wherein the server provides access to the service if the visual test is passed.

In another embodiment, a system for preventing an unauthorized user in a networked computing environment includes a client computer provided with a visual test upon a request transmitted through a network by the client computer for a service, wherein the visual test is displayed on a video display, wherein the visual test requires the performance of a predetermined action on a group of images displayed on the video display in order to gain access to the service, and wherein the group of images comprises at least two images that are associated with each other.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
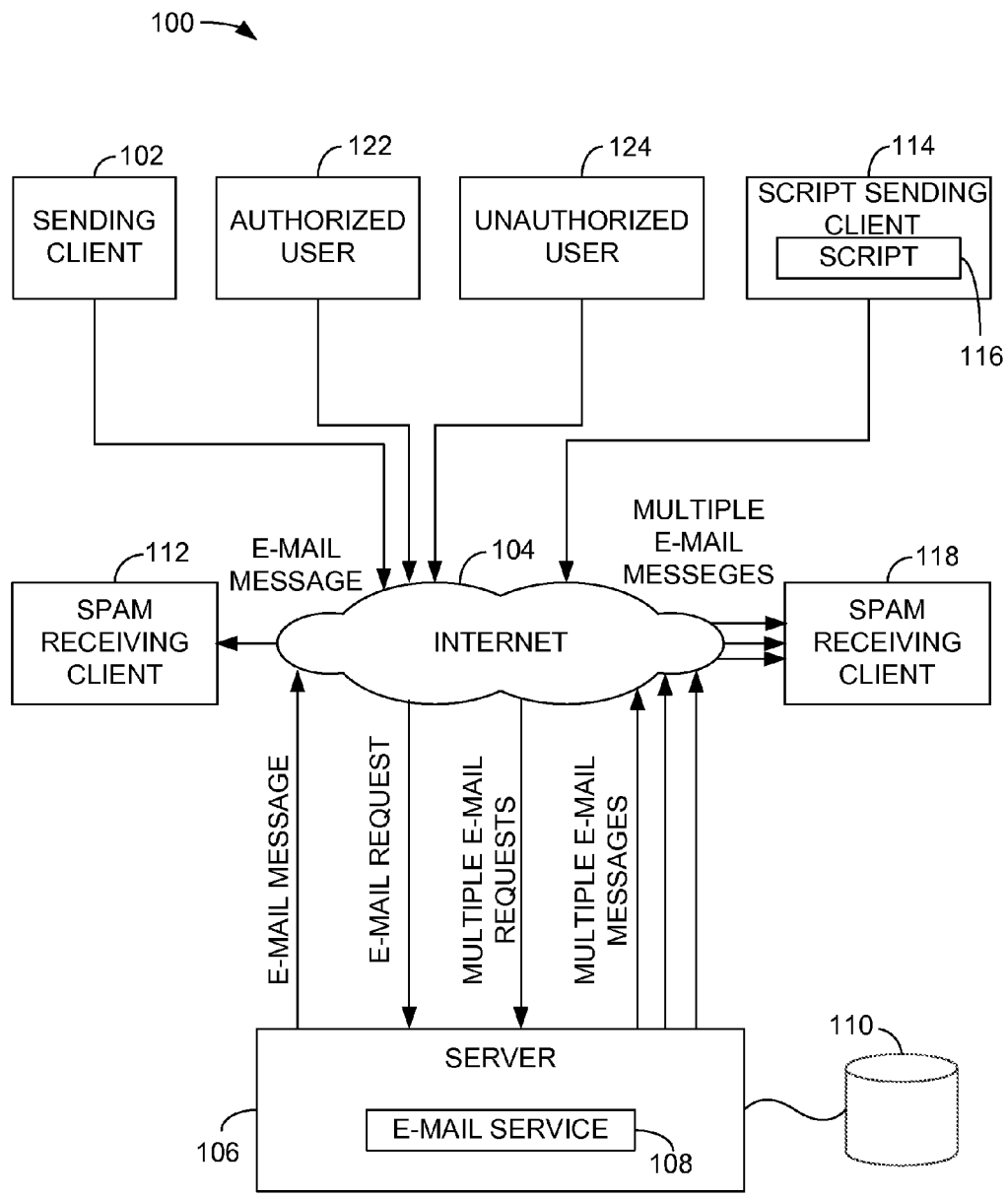
FIG. 1 illustrates an example of a computing environment in which SPAM is not blocked and in which users of networked computing services are not validated to ensure that the users are human.

The system and method for preventing automated programs and unauthorized users in a network will be described in the context of reducing e-mail SPAM and preventing the unauthorized use of an email account. However, the system and method for preventing automated programs and unauthorized users in a network is applicable to all networked computing services in which it is desirable to verify that the user is a human being and to authenticate the user. The system and method for preventing automated programs and unauthorized users in a network effectively distinguishes between human users and computer scripted users, and also effectively distinguishes between an authorized and an unauthorized human user. The system and method for preventing automated programs and unauthorized users in a network make it difficult for automated scripts or any other automated computer programs to use image filtering programs to gain access to computing services. The system and method for preventing automated programs and unauthorized users in a network also make it difficult for unauthorized individuals to defeat an authentication system to gain access to computing services. These unauthorized individuals may be hired to defeat the authentication system or may just be so called "hackers" that attempt to defeat an authentication system.

The system and method for preventing automated programs and unauthorized users in a network can be implemented in hardware, software, or a combination of hardware and software. When implemented in hardware, the system and method for preventing automated programs and unauthorized users in a network can be implemented using specialized hardware elements and logic. When the system and method for preventing automated programs and unauthorized users in a network is implemented in software, the software can be used to control the various components in a system and network associated with the program. The software can be stored in a memory and executed by a suitable instruction execution system (microprocessor). The hardware implementation of the system and method for preventing automated programs and unauthorized users in a network can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for preventing automated programs and unauthorized users in a network comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, method, process or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic), a portable computer diskette (magnetic), a random access memory (RAM), a read-only memory (ROM), an erasable programmable read-only memory (EPROM or Flash memory) (magnetic), an optical fiber, and a portable compact disc read-only memory (CDROM). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 1 illustrates an example of a computing environment 100 in which SPAM is not blocked and in which users of networked computing services are not validated to ensure that the users are human and are not authenticated to ensure that the user is authorized. A sending client 102 is a computer from which a user can send an e-mail message. One of ordinary skill in the art will recognize that the sending client 102 can be any computing device such as a personal computer ("PC"), laptop, personal digital assistant ("PDA"), cellular phone, MP3 player, remote control, etc. An authorized user 122, such as a culturally specific user, can be a human user that is authorized to use a computing service, such as e-mail. The term "culturally specific" is intended to denote a user from a particular cultural or geographic background, such as a user in the United States of America. An unauthorized client 124, such as a human being that is culturally different than the authorized client 122, may be hired to defeat an authentication process.

The sending client 102, authorized user 122 and the unauthorized user 124 connect to a server 106 through a network, such as the Internet 104. One of ordinary skill in the art will also recognize that this system and method can work in any type of network configuration including but not limited to a wireless network, local area network ("LAN"), wide area network ("WAN"), etc. By connecting to the server 106, the sending client 102 is able to use an e-mail service 108 to compose an e-mail message. The authorized user 122 is able to use a networked computing service and the unauthorized user 124 is also able to use a networked computing service. The server 106 is connected to a database 110 which stores data such as the inbox of the sending client 102. The database 110 can also store data such as an address book so that the user can send an e-mail to another user without having to remember the other user's e-mail address.

Using email as an example, after the user composes the e-mail message, the user presses a send button (not shown) to instruct the e-mail service 108 to send the e-mail message to another e-mail address. The e-mail message is then routed through the Internet 104 to the appropriate e-mail address. A spam receiving client 112 then receives the e-mail message.

While the receiving client 112 is a computer that has a user who wanted to receive an e-mail message from the sending client 102, many computer users receive unwanted SPAM. One of the propagators of SPAM is a script sending client 114 that uses a script 116 to impersonate human users. One of ordinary skill in the art will recognize that the script 116 can be written using any known computer language. After the script sending client 114 connects to the server 106 through the Internet 104, the script sending client 114 can compose a large number of e-mail messages in a short period of time using the e-mail service 108. As a result, a large number of e-mail messages can be transmitted through the Internet 104 to a SPAM receiving client 118.

Figure 2:
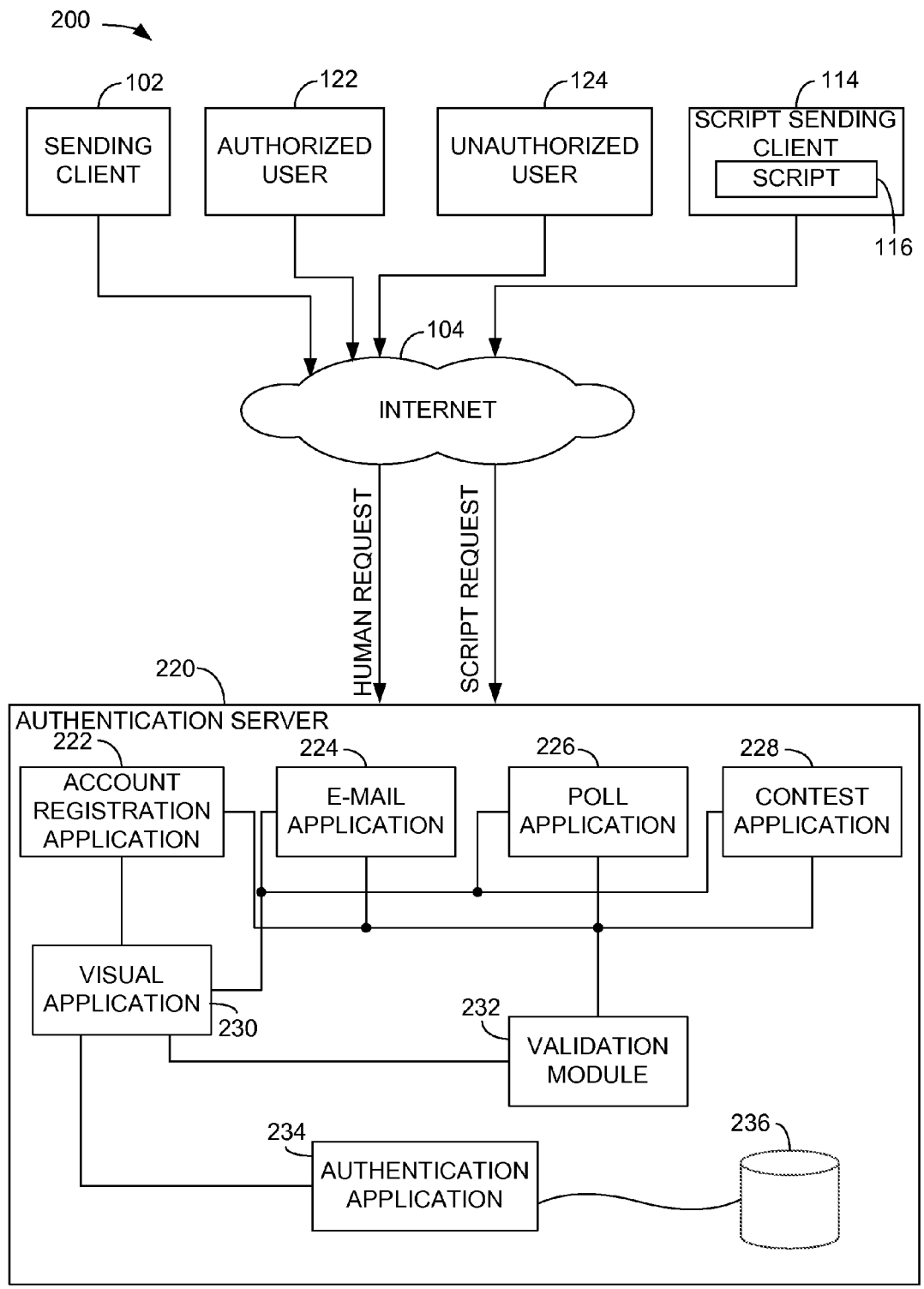
FIG. 2 illustrates an authentication system for preventing automated programs and unauthorized users in a network which can be used, in an embodiment, to reduce the amount of SPAM that the SPAM receiving client receives and to prevent unauthorized users in a network.

FIG. 2 illustrates an authentication system 200 for preventing automated programs and unauthorized users in a network which can be used, in an embodiment, to reduce the amount of SPAM that the SPAM receiving client 118 (FIG. 1) receives and to prevent unauthorized users in a network. However, the authentication system 200 for preventing automated programs in a network can be used to prevent the use of other types of automated programs in a network, and can be generally used to provide verification that a user of computing services in a network is an authorized human user. As illustrated in FIG. 2, the sending client 102, the authorized user 122, the unauthorized user 124 or the script sending client 114 can connect to an authentication server 220 through the Internet 104. In an embodiment, the authentication server 220 stores an account registration application 222. In an embodiment, a computer user can use the account registration application 222 to create an e-mail account. In another embodiment, the computer user can use the account registration application 222 to subscribe to electronic services such as electronic newsletters, electronic news, e-mail notifications, sports scores, etc. Further, in an embodiment, the authentication server 220 has an e-mail application 224 in which a user can send or receive e-mail using an e-mail account set up through the account registration application. In addition, in an embodiment, the authentication server 220 has a poll application 226 in which the user can vote on a topic displayed on a web page stored in a database 236 associated with the authentication server 220. Finally, in an embodiment, the authentication server 220 has a contest application 228 in which the computer user can enter a contest to win a prize. One of ordinary skill in the art will recognize that other types of applications such as games, videos, music, computer research, etc. can be provided by the authentication server 220.

In order for a computer user to use the account registration application 222, the e-mail application 224, the poll application 226, the contest application 228, or any other application restricted in a like manner, the computer user must prove that the computer user is human as opposed to the script 116 and that the computer user is the authorized computer user. An authentication system will now be discussed for differentiating the authorized human computer user 122 from the script 116 and from an unauthorized computer user 124.

Restrictions on the use of certain applications stored on the authentication server 220 may invoke a visual application 230. An example of a visual application is a flash application. Further, in an embodiment, the visual application 230 may have an audio component or an audio-visual component. The visual application 230 will provide a visual test for the computer user to pass in order for the restriction to be met. In an embodiment, the visual application 230 provides a visual test when a user attempts to register for an e-mail account using the account registration application 222. In other embodiments, the visual application 230 provides a visual test when a user attempts to use any computing service that is available on the authentication server 220. The authentication server 220 will ensure that all users that register for e-mail accounts are human users, not automated scripts and that the users are authorized users. Further, the authentication server 220 will ensure that all users that attempt to use any networked computing service associated with the authentication server 220 are human users, not automated scripts and that the users are authorized users. The authentication server 220 can be programmed with stringent requirements at the outset to preemptively minimize or eliminate unauthorized users. One of ordinary skill in the art will recognize that the visual application 230 is meant to include future developments in graphics software. Future development may lead to graphics software that is even more difficult for image filtering programs to defeat.

In an embodiment using email as an example, a computer user submits identification information (e.g., name, user name, address, etc.) through the account registration application 222. After entering all of the information, the user indicates that the information is complete by pressing a button such as a send button, a complete button, a done button, etc. The visual application 230 then provides a visual test prior to submitting the information for establishing the e-mail account or providing the service. In an embodiment, the visual application 230 displays a screen that has a randomly selected shaped object positioned at a randomly selected position therein. In another embodiment, the shaped object is a geometric shape. In another embodiment, the shaped object is a cartoon character. For instance, the shaped object can be a recognizable cartoon character. In another embodiment, the shaped object can be a graphically imaged character. For instance, an image of a person, pet, object, etc. can be graphically encoded to be used as the shaped object. In another embodiment, the shaped object is a graphical icon. For instance, images that are displayed on a computer can be used as the shaped object. In yet another embodiment, the visual application 230 displays a screen that has a randomly selected non-textual image positioned at a randomly selected position therein.

In another embodiment, the visual application 230 creates a game that is visually displayed, or presented in an audio form, and that can be culture specific. In this manner, the visual application 230 can deny access to the computing service to a non-human script generating program and to a human that may be attempting to defeat the authentication process associated with the computing service.

Examples of games that may be provided by the visual application 230 include, for example, a game that requires the user to pair images that are similar or in other respects associated with each other. Certain human knowledge is required to successfully pair the images and win the game, such as recognizing an image is a piece of pie, an apple, or a flag. This method excels in the context that human beings possess more complicated knowledge and sense that cannot be imitated by machine intelligence. For example, human beings can easily recognize cartoon characters that are related to other scenes and characters in the same movie.

To prevent individuals hired by contracted outsourcing companies from compromising the authentication process, an implementation of the invention can be culture specific to the targeted country. For example, images of a pie, a baseball, and a maple leaf are arranged for users to select related items. For users in the United States, it would be straight forward to recognize that the pie and baseball are specific to American culture and that a maple leaf is specific to Canadian culture. For individuals in another region of the world, the culture implication may not be obvious.

The computer user selects the shape or image with a mouse pointer, or other input device, to pass the visual test. In an embodiment, the user selects the shape within a given time limit. In another embodiment, if the user does not select the shape within the given time limit, the display screen is erased and another randomly selected shape appears at another randomly selected position within the display screen. In yet another embodiment, the randomly selected shapes at randomly selected positions are chosen and erased for a predetermined number of times. If the user has not chosen the correct shape within the pre-determined number of displays of randomly selected shapes displayed in randomly selected positions, the user is not allowed to register for an e-mail account.

In another embodiment, a user is presented with a variety of images in which one or more of the images are generally associated via a cultural or intuitive connection. For example, three images may be presented to the user in which two of the images are of cartoon characters that are generally associated together and in which a third image is of a cartoon character from a different category that the first two images. A non-limiting example is presenting images of three American recognizable cartoon characters, two of which are culturally, or otherwise, related to each other while the third of which is not culturally, or otherwise, related to the other two to the user. A user familiar with American cartoons will associate the two related cartoon characters with each other and will recognize that the third cartoon character does not belong with the other two cartoon characters. In another non-limiting example, users in the United States would likely recognize that apple pie and baseball are specific to American culture and that a maple leaf is specific to Canadian culture. For individuals in another region of the world, the cultural implication will likely not be obvious. The images that are presented to the user can be culturally and/or intuitively relevant. While three images are described herein as being presented as a group of images to a user, the group of images may include more than three images.

The use of the visual application 230 to generate the visual test makes the use of image filtering programs very difficult. In an embodiment, the visual application 230 only appears to display one shape, or one series of images to the user on the display screen. However, the visual application 230 actually provides a variety of shapes and images to the display screen which are positioned in different layers of the display screen. In an embodiment, the user only sees one shape, or one series of images, on the display screen, but an image filtering program would see a large number of shapes to choose from.

In another embodiment the visual application 230 displays at least three images to the user on the display screen. At least two of the displayed images are culturally, intuitively, or otherwise related while the third image is not so related to the other two images. An image filtering program or a user of a different culture would have great difficulty determining the relevance of the images and in selecting the culturally and/or intuitively relevant images.

In this embodiment, the visual test is not limited to any particular images. Any set of images in which one or more of the images is distinguishable from the other images can be used. Preferably, the images are selected to have a particular cultural and/or intuitive relevance that would prevent an automated program or script, or a user of a different cultural background from selecting the relevant image or images.

The visual test is not limited to a randomly selected shape appearing at a randomly selected position, or to any particular type of image or images. In an alternative embodiment, the visual test is a randomly selected shape that moves from one position in the display screen to a variety of different positions in the display screen. In this embodiment, the user must "catch" the moving object by placing the mouse pointer over the moving object and by pressing the mouse button when the mouse pointer is over the moving object. An image filtering program will have an even more difficult time determining the location of a moving object and also determining the coordinates for the movement of the mouse pointer to "catch" the moving object. In yet another embodiment, the visual test requires the dragging of an object from a starting position to an ending position. An image filtering program would have great difficulty finding the location of the randomly selected object, determining the distance that the object has to be moved, and providing the coordinates for the positions that the mouse has to drag the object with. In yet another embodiment, the user drags multiple objects together. For example, the user may have to drag one dot to touch another. The user may also have to put pieces of a puzzle together. In yet another embodiment, a user can shoot an object such as a ball at a target. The user may also be able to use a computerized gun or projectile propagator to send a computerized bullet or computerized projectile at a target in order to pass the visual test. For example, the user may play a computerized basketball game to shoot a computerized basketball into a hoop to pass the visual test. The user may also be required to play computerized games such as pinball to pass the visual test.

In yet another embodiment, the visual application 230 can provide a visual test when a user attempts to use the e-mail application 224 to send an e-mail message. The authentication server 220 will attempt to prevent automated scripts from sending messages to a large number of recipients. On the other hand, the authentication server 220 may allow a human user to send a large number of messages. In an embodiment, a computer user composes an e-mail message and presses a send button in a graphical user interface ("GUI"). If the number of recipients is greater than a predetermined number of recipients, then the visual application 230 displays a visual test in the GUI. In an embodiment, the visual test is displayed in the same GUI that displays the e-mail message that is being composed. In another embodiment, the visual test is displayed in a separate GUI from the GUI that displays the e-mail message.

In another embodiment, the visual application 230 can provide a visual test when a user attempts to use the poll application 226. After the computer user presses a vote button displayed in a GUI, the visual application 230 can display a visual test that the computer user must pass before the authentication server 220 will actually place the vote. In another embodiment, the computer user must pass the visual test before having the opportunity to place a vote. One of ordinary skill in the art will recognize that the poll application 226 can be any of a wide variety of computer applications in which a vote is placed.

In another embodiment, the visual application 230 can provide a visual test when a user attempts to use the contest application 228 to enter a contest. One of ordinary skill in the art will recognize that the contest can be a game, sweepstakes, etc. Further, one of ordinary skill in the art will recognize that the contest can be with or without a prize winning.

In yet another embodiment, the visual application 230 can provide a visual test for any type of service that can be provided through a network. The visual application 230 can even be used as an extra layer of security for accessing secure web pages. For example, the visual test can be used as an extra layer of protection besides the use of a user name and a password.

The visual application 230 generates the visual, or audio-visual, test for the account registration application 222, the e-mail application 224, the poll application 226, or the contest application 228 by communicating with a validation module 232. In an embodiment, the validation module 232 is a validation application programming interface ("API"). In order to create a visual test, the visual application 230 requests a series of randomly selected images in which at least two of the images are culturally or intuitively related and a third image that is not so related to the first two images. The images include information allowing the visual application 230 to identify the images and to identify whether the images are correctly chosen by the user.

In another embodiment, the visual application 230 requests a randomly selected geometric shape from the validation module 232. Subsequently, the validation module 232 provides the series of randomly selected images or a randomly selected geometric shape and an ID to the visual application 230. In an embodiment, the ID is a transaction ID. In yet another embodiment, the ID) is a unique user identification. An example of a unique user identification is a "cookie." In another embodiment, the ID is an Internet Protocol ("IP") address. In yet another embodiment, the ID is an IP address and the date that a request for services was sent.

In an embodiment, the validation module 232 requests the series of randomly selected images or a randomly selected geometric shape from an authentication application 234 which can access an image database 236. In yet another embodiment, the validation module 232 communicates directly with the image database 236.

The ID is a textual string used for identifying the randomly selected images or the geometric shape that was sent to the visual application 230 at a specific time. The ID also contains information relating to the relationship among the selected images so that the visual application 230 can discern whether the user has correctly chosen the image or images that would result in a successful combination and allow the user to be authenticated. In an embodiment, the validation module 232 retains a copy of the ID and the randomly selected images or the geometric shape in a memory associated with the validation module 232 for future lookup. The validation module 232 then sends the randomly selected images or the geometric shape and the ID to the visual application 230. In an embodiment, the validation module 232 encrypts the data that the validation module 232 provides to the visual application 230. One of ordinary skill in the art will be familiar with the different encryption algorithms. After receiving and decrypting the data (if necessary), the visual application 230 determines where to display the series of images on the display of the GUI. In another embodiment, the visual application 230 determines a random position within the display of the GUI in which to display the randomly selected geometric shape. In another embodiment, the validation module 232 also randomly selects a variety of additional geometric shapes that can be positioned by the visual application 230 at different layers of the GUI. As discussed above, the use of the additional geometric shapes at different layers of the GUI will help prevent image filtering programs from passing the visual test. In yet another embodiment, the visual application 230 can randomly select the geometric shape and/or the additional geometric shapes.

The visual application 230 can set different criteria for passing the visual test. In an embodiment, the computer user must select the two related images or the randomly selected and randomly positioned geometric shape within a given time period. If the computer user does not select the two related images, the randomly selected and randomly positioned geometric shape, or whatever game is implemented within the given time period, the computer user does not pass the visual test. If the computer user selects the two related images or the randomly selected shape within the time period, the visual application 230 sends the two related images or the randomly selected shape chosen by the computer user along with the ID to the validation module 232. In an embodiment, the two related images or the randomly selected shape and the ID are encrypted by the visual application 230 prior to being sent to the validation module 232. After the validation module 232 receives the two related images or the randomly selected geometric shape and the ID, the validation module 232 decrypts the two related images or the randomly selected geometric shape and the ID (if necessary) and compares the two related images or the randomly selected geometric shape and the ID that were received with the two related images or the randomly selected geometric shape and the ID that were stored in the memory associated with the visual application 230. If the comparison results in a match, the computer user has passed the visual test. The validation module 232 then sends an access instruction to the authentication application 234 which allows the computer user to access the requested service. If the computer user is an automated script, the computer user may attempt to guess the associated of the images or a shape and an ID to be sent to the validation module 232. Accordingly, the validation module 232 will compare the received images or shape and the ID with the two related images or the randomly selected shape and the ID that the validation module 232 stored in memory. A pure guess by an automated script is unlikely to produce the two related images or the randomly selected shape and the ID. Therefore, the validation module 232 will likely find an incorrect comparison and deny the computer user access to the requested service.

In an embodiment, the validation module 232 will expire the ID for the two related images or the randomly selected geometric shape after a comparison is made regardless of whether or not the comparison is successful. If the computer user is an automated script, the computer user may attempt to send a large number of guessed shapes and guessed ID's to the validation module 232. By expiring the current ID for two related images or a given randomly selected geometric shape, the validation module 232 further decreases the likelihood that an automated script will gain access to a requested service.

The authentication application 234 is essentially a software program that prevents the computer user from accessing a requested service without meeting certain requirements. In an embodiment, the authentication application 234 provides permission to the visual application 230 for the computer user to access the requested service. In yet another embodiment, the visual application 230 provides permission directly to the account registration application 222, the e-mail application 224, the poll application 226, or the contest application 228.

One of ordinary skill in the art will recognize that the authentication system 200 can be applied to other types of applications such as games, videos, music, computer research, etc. The authentication system 200 can even be used to restrict the viewing of content on a web page.

Figure 3:
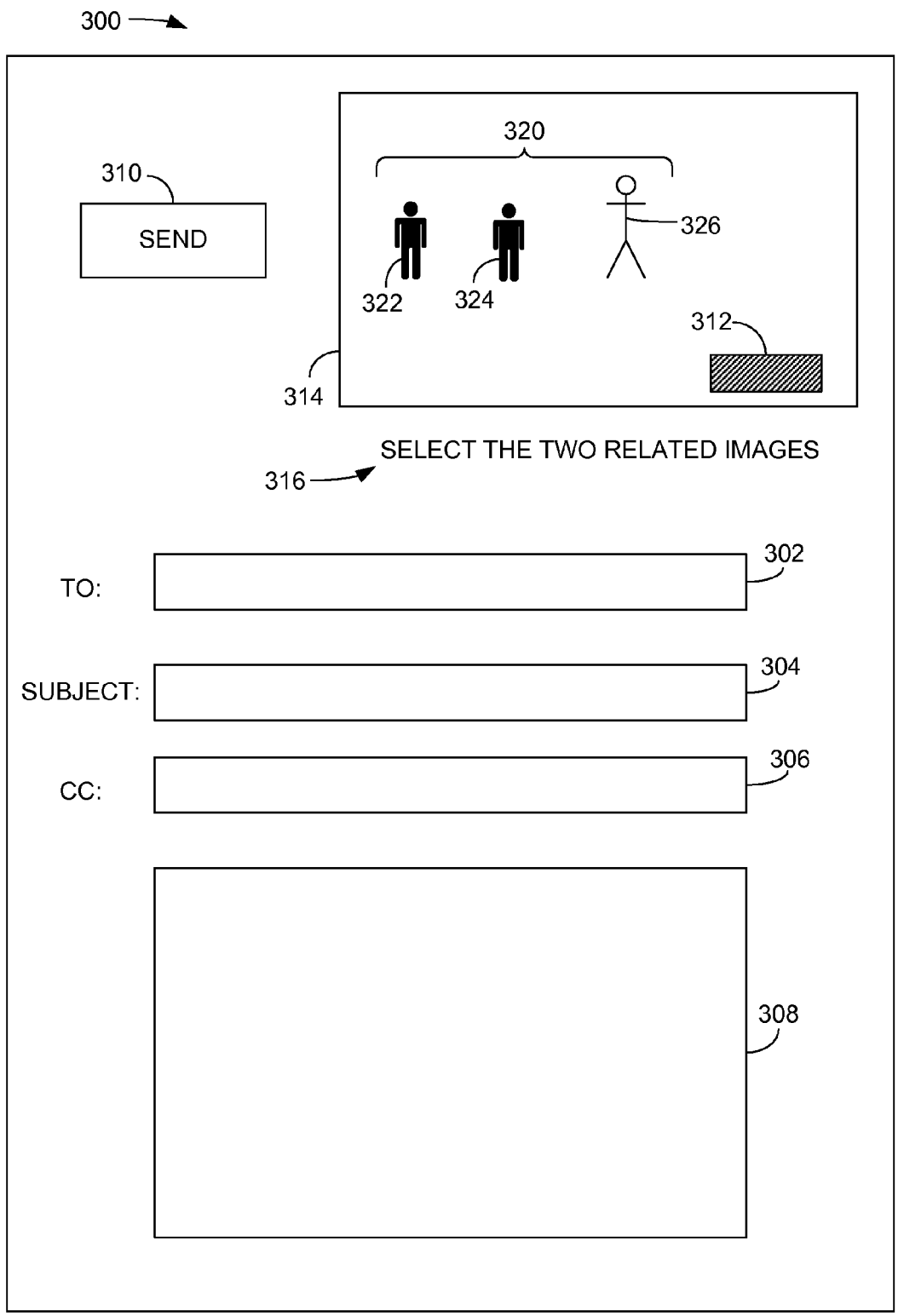
FIG. 3 illustrates a video display in which a computer user can compose an e-mail message using the e-mail application.

FIG. 3 illustrates a video display 300 in which a computer user can compose an e-mail message using the e-mail application 224. The video display 300 can be a GUI displayed in a web browser or in another software application. In an embodiment, the video display 300 has data entry lines such as a To: data entry line 302, a Subject: data entry line 304, and a CC: data entry line 306. One of ordinary skill in the art will recognize that additional data entry lines such as a From: data entry line can be incorporated into the video display. The computer user can enter recipients into the To: data entry line 302. In addition, the computer user can enter the text of the e-mail message into a text box 308. After the user has finished composing an e-mail message, the computer user can press a send button 310 to indicate that the e-mail should be sent to the recipient(s). In an embodiment, the visual application 230 displays a group of images 320 that the visual application 230 receives from the validation module 232 in a verification display 314. In an embodiment, the group of images 320 comprises at least two images that are culturally, intuitively, or otherwise related and one image that is not so related to the other two images. In an embodiment, a first image 322 and a second image 324 are culturally, intuitively, or otherwise related while a third image 326 is not so related to the images 322 and 324. For example, the first image 322 may be an image of a recognizable cartoon character and the second image 324 may be an image of a recognizable cartoon character that is related to the first image. The third image 326 may be an image of another recognizable cartoon character that is not related to the first image 322 and the second image 324. When presented with these three images, most Americans will realize that the first image 322 and the second image 324 are related and that the third image 326 is not so related to the first image 322 and the second image 324.

The group of images 320 is not limited to three images, or to any particular subject or format. For example, other images that possess some form of cultural, intuitive, or other distinction may be used, depending on where the system is implemented. In an embodiment, a set of directions 316 is displayed so that the computer user is informed of the action that the computer user must take to pass the visual test displayed in the verification display 314. In this example, the instructions may be "select the two related images," or "select the image that does not belong."

In an embodiment, the set of directions 316 is constructed according to criteria stored in the visual application 230. If the computer user performs the action as instructed by the set of directions 316 in a given time period, the composed e-mail message is sent to the recipients. On the other hand, if the computer user does not perform the requested action within the given time period, the computer's e-mail message does not get sent to the recipients based on the assumption that a human user would have been able to pass the visual test depicted in the verification display 314. In another embodiment, the computer user is given multiple chances to pass the visual test. For instance, a computer user may get up and walk away from the computer as the visual test is displayed. Therefore, after the given time period has elapsed, another group of images 320 appears within the verification window. The computer user may only be given a predetermined number of chances. Each of these chances could comprise different visual tests. The visual test on the first chance may be to select the two images that are related while the visual test on the second chance may be to select the image that does not belong. The set of directions 316 would change on each chance to inform the computer user of the requirements needed to pass the visual test. By varying the visual test on each chance given to the computer user, an automated script has an even more difficult time in gaining access to the requested services. In yet another embodiment, the computer user is only given subsequent chances if the computer user does not make an attempt at the visual test. In another embodiment, the verification display 314 is a separate screen from the visual display 300. In yet another embodiment, the verification display 314 is displayed in the same web browser but on a different web page from the visual display 300.

In another embodiment, the visual application module 230 (FIG. 2) will request a randomly selected shape from the validation module 232. In an embodiment, the visual application 230 displays a randomly selected shape 312 that the visual application 230 receives from the validation module 232 in a verification display 314. A set of directions 316 is displayed so that the computer user is informed of the action that the computer user must take to pass the visual test displayed in the verification display 314. In an embodiment, the set of directions 316 is constructed according to criteria stored in the visual application 230. If the computer user performs the action as instructed by the set of directions 316 in a given time period, the composed e-mail message is sent to the recipients. On the other hand, if the computer user does not perform the requested action within the given time period, the computer's e-mail message does not get sent to the recipients based on the assumption that a human user would have been able to pass the visual test depicted in the verification display 314. In another embodiment, the computer user is given multiple chances to pass the visual test. For instance, a computer user may get up and walk away from the computer as the visual test is displayed. Therefore, after the given time period has elapsed, another randomly selected shape appears within the verification window. The computer user will only be given a predetermined number of chances. Each of these chances could comprise different visual tests. The visual test on the first chance may be selecting a geometric object while the visual test on the second chance may be dragging a geometric object from a starting position to an ending position. The set of directions 316 would change on each chance to inform the computer user of the requirements needed to pass the visual test. By varying the visual test on each chance given to the computer user, an automated script has an even more difficult time in gaining access to the requested services. In yet another embodiment, the computer user is only given subsequent chances if the computer user does not make an attempt at the visual test. In another embodiment, the verification display 314 is a separate screen from the visual display 300. In yet another embodiment, the verification display 314 is displayed in the same web browser but on a different web page from the visual display 300.

One of ordinary skill in the art will recognize that GUI's similar to the visual display 300 can be constructed for services other than the e-mail application 224, e.g. the account registration application 222, the poll application 226, or the contest application 228. Further, one of ordinary skill in the art will recognize that the visual display 300 can be displayed on an LCD screen, a plasma screen, a PDA display, and any other visual medium for displaying data.

Figure 4:
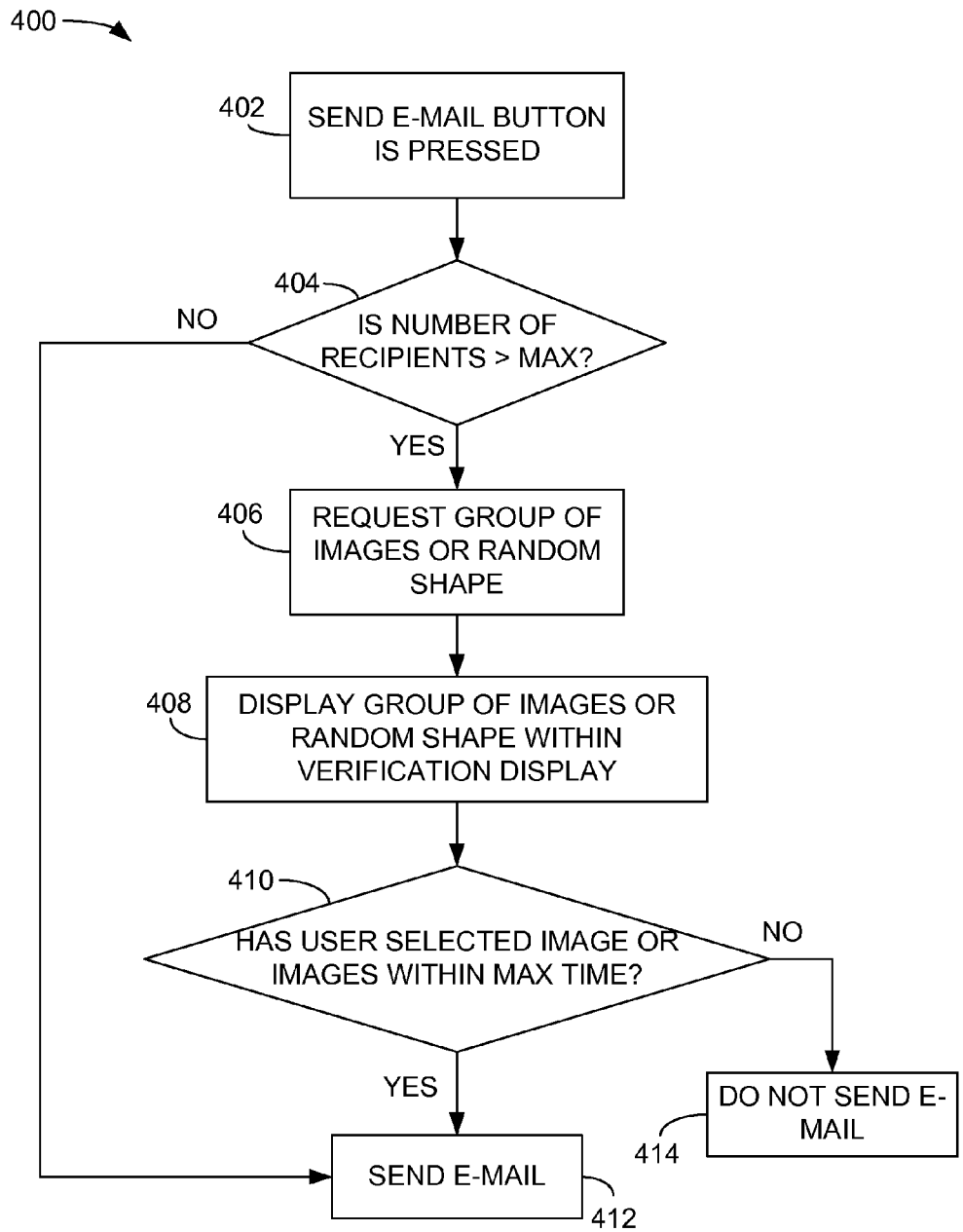
FIG. 4 illustrates a process for reducing the use of automated scripts in services such as the account registration application, the e-mail application, the poll application, or the contest application of FIG. 2.

FIG. 4 illustrates a process 400 for reducing the use of automated scripts and unauthorized users in services such as the account registration application 222, the e-mail application 224, the poll application 226, or the contest application 228. The blocks in the process shown in FIG. 4 can be performed in or out of the order shown by the elements described above, or can be performed by different elements. By way of example, the process 400 is explained with respect to the e-mail application 224. However, the process 400 is applicable to any user of a networked service. After a computer user composes an e-mail message as explained in FIG. 3, the computer user presses the send button 310 at a process block 402 to send the e-mail message the recipient(s). The process 400 then advances to a decision block 404 where the process 400 determines if the number of recipients exceeds a predetermined minimum requirement. Computer users would be inconvenienced if they had to pass the visual test every time they send an e-mail message to a few people. Therefore, if the number of recipients is less than a predetermined minimum, the process 400 advances to a process block 412 where the e-mail message is sent to the recipient(s). However, if the number of recipients is greater than a predetermined minimum, then the process 400 advances to a process block 406 where the visual application 230 (FIG. 2) requests a group of images or a randomly generated geometric shape from the validation module 232 based on the assumption that an e-mail sent to a large number of recipients may be made by an automated script. In another embodiment, a maximum number of recipients can also be set and test in the process block 404.

After the visual application 230 receives the group of images or the randomly selected geometric shape at the process block 406, the visual application 230 selects a random position within the verification display 314 to display the group of images or the randomly selected geometric shape at a process block 408. The process 400 then advances to a decision block 410 where the process 400 determines if the computer user has selected the desired image or images or the geometric shape within a predetermine maximum amount of time. If the computer user selects the desired image, images or the geometric shape within the predetermined amount of time, the process 400 assumes that the computer user is a human user and sends the e-mail. However, if the computer user does not select the desired image, images or the geometric shape within the predetermine amount of time, the process 400 assumes that the computer user is an automated script and does not send the e-mail message. One of ordinary skill in the art will recognize that other embodiments may include the variations discussed with respect to FIG. 3 for providing the computer user with multiple chances after the maximum period of time has elapsed subject to a maximum number of chances.

While various embodiments of the invention have been described, it will be apparent to those of ordinary skill in the art that many more embodiments and implementations are possible that are within the scope of the invention. The invention is not limited to a specific type of system and method for preventing automated programs in a network. For example, the system and method for preventing automated programs in a network can be implemented with a variety of visual tests.

What is claimed is:

1. A system for preventing an unauthorized user in a networked computing environment, comprising:
 a server configured to provide access to a service, wherein the service is stored on a memory associated with the server;
 a software module stored on the server, wherein the software module provides a visual test upon receiving a request transmitted through a network for the service, wherein the visual test comprises performing a predetermined action on a random group of images in order to access the service, each image in the random group of images depicting a respective object, wherein a plurality of the depicted objects, excluding at least one depicted object, are culturally or intuitively related to one another, wherein the visual test provides instructions for performing the predetermined action on the random group of images, wherein the software module is configured to independently support each individual predetermined action selected from: (i) dragging a predetermined image from its random location to a random target location and (ii) activating a cursor when the cursor is hovering over a predetermined image automatically moving from its random location to a random target location; wherein each predetermined image is selected from: (i) a culturally or intuitively related image and (ii) a culturally or intuitively unrelated image; thereby decreasing likelihood of a computer program, unaided by any end-user, passing the visual test;
 a validation software module, stored on the server, configured to: receive a request from the software module for the group of images, randomly select the group of images to be transmitted to the software module, and provide the random group of images to the software module; and
 an access software module configured to, upon the validation software module determining that the visual test has been passed, receive an access instruction from the validation software module.

2. The system of claim 1, wherein the validation software module further provides a first ID to the software module.

3. The system of claim 2, wherein the software module provides a second ID along with at least one user-selected image from the random group of images provided to the validation software module.

4. The system of claim 3, wherein the validation software module provides the first ID along with at least one selected image from the random group of images to the software module.

5. The system of claim 4, wherein the validation software module determines whether the at least one user-selected image from the random group of images and the second ID are identical to the at least one selected image that the validation software module provided to the software module and to the first ID, respectively.

6. The system of claim 5, wherein the validation software module provides an access instruction to the access module.

7. The system of claim 6, wherein the access module provides, to a requesting entity, access to the service only if the visual test is passed within a predetermined number of independent administrations of the visual test for the requesting entity, each administration having a distinct group of random images, wherein each administration subsequent to a first-in-time of the administrations is provided only upon a predefined period of time elapsing without receiving, from the requesting entity, any input pertaining to the previous administration of the visual test, wherein at least one image from the random group of images depicts the at least one object that is not culturally related and not intuitively related to the plurality of the depicted objects.

8. The system of claim 7, wherein the first ID expires after the validation software module determines whether the at least one user-selected image and the second ID are identical to the first ID and the at least one selected image that the validation software module provided to the software module.

9. The system of claim 8, wherein the validation module further provides, in the random group of images, a plurality of false shapes to the software module in order to increase difficulty of performing filtering on the random group of images, wherein the validation module is further configured to encrypt the random group of images, wherein the random group of images provided to the software module is encrypted;

wherein each image in each administration is disposed at a random location within a display area associated with the visual test, wherein each administration of the visual test is associated with a distinct set of random locations for displaying the random group of images of the respective administration.

10. A system for preventing an unauthorized user in a networked computing environment, comprising a client computer provided with a visual test upon a request transmitted through a network by the client computer for a service, wherein the visual test is displayed on a video display and requires performing a predetermined action on a random group of images displayed on the video display to access the service, each image in the random group of images depicting a respective object, wherein a plurality of the depicted objects, excluding at least one depicted object, are culturally or intuitively related to one another, and wherein the visual test provides instructions for performing the predetermined action on random group of images, wherein the system is configured to independently support each individual predetermined action selected from: (i) dragging a predetermined image from its random location to a random target location and (ii) activating a cursor when the cursor is hovering over a predetermined image automatically moving from its random location to a random target location; wherein each predetermined image is selected from: (i) a culturally or intuitively related image and (ii) a culturally or intuitively unrelated image; thereby decreasing likelihood of a computer program, unaided by any end-user, passing the visual test.

11. The system of claim 10, wherein the visual test further comprises catching a selected image that moves from a first position in the video display to at least a second position in the video display.

12. The system of claim 10, wherein the visual test further comprises selecting a variety of additional images that are positioned at different layers of the video display.

13. A method for preventing an unauthorized user to computing services, the method comprising:

receiving a request to perform a computing service;

determining whether a set of criteria has been met;

requesting a visual test upon determining that the set of criteria has not been met, the visual test comprising taking a predetermined action on a random group of images within a given time period, each image in the random group of images depicting a respective object, wherein a plurality of the depicted objects, excluding at least one depicted object, are culturally or intuitively related to one another, the visual test providing instructions for performing the predetermined action on the random group of images, wherein each individual predetermined action is independently supported, selected from: (i) dragging a predetermined image from its random location to a random target location and (ii) activating a cursor when the cursor is hovering over a predetermined image automatically moving from its random location to a random target location; wherein each predetermined image is selected from: (i) a culturally or intuitively related image and (ii) a culturally or intuitively unrelated image; thereby decreasing likelihood of a computer program, unaided by any end-user, passing the visual test; and performing the computing service upon determining that the set of criteria has been met or upon determining that the predetermined action on the random group of images has taken place within the given time period.

14. The method of claim 13, wherein each of the plurality of images from the random group of images depict at least a first object that is culturally related.

15. The method of claim 13, wherein each of the plurality of images from the random group of images depict at least a first object that is intuitively related.

16. The method of claim 13, further comprising providing a first ID along with the random group of images.

17. The method of claim 16, further comprising providing a second ID and at least one user-selected image from the random group of images.

18. The method of claim 17, further comprising providing the first ID along with at least one selected image from the random group of images.

19. The method of claim 18, wherein determining that the predetermined action on the random group of images has taken place within the given time period comprises determining if the at least one user-selected image from the random group of images and the second ID are identical to the at least one selected image from the random group of images and to the first ID, respectively.

20. A method for preventing an unauthorized user, comprising:

displaying to a user a random group of images comprising a plurality of images, each image depicting a respective object, wherein a plurality of the depicted objects, excluding at least one depicted object, are culturally or intuitively related to one another;

displaying to the user instructions for performing the predetermined action on the random group of images, the instructions instructing the user to identify images that are culturally or intuitively related, wherein individual predetermined action is independently supported, selected from: (i) dragging a predetermined image from its random location to a random target location and (ii) activating a cursor when the cursor is hovering over a predetermined image automatically moving from its random location to a random target location; wherein each predetermined image is selected from: (i) a culturally or intuitively related image and (ii) a culturally or intuitively unrelated image; thereby decreasing likelihood of a computer program, unaided by any end-user, passing the visual test; and allowing access to a computing service when the plurality of images are identified to the exclusion of the at least one image.

21. The method of claim 20, further comprising catching a selected image that moves from a first position in a video display to at least a second position in the video display.

22. The method of claim 20, further comprising selecting one or more additional images that are positioned at different layers of a display.

* * * * *